United States Patent

Bennett et al.

[15] 3,688,286

[45] Aug. 29, 1972

[54] DIGITAL DATA RECORDING AND REPRODUCING SYSTEM

[72] Inventors: William C. Bennett, Menlo Park; David C. Condon, Monte Sereno; Rodney O. Brink, Los Altos, all of Calif.

[73] Assignee: Novar Corporation, Mountain View, Calif.

[22] Filed: April 6, 1970

[21] Appl. No.: 25,651

[52] U.S. Cl....340/174.1 G, 340/173 RC, 235/92 SH

[51] Int. Cl...............................................G11b 5/00

[58] Field of Search..........235/92 SH, 340/173 RC, 174.1 A, 174.1 G

[56] References Cited

UNITED STATES PATENTS

| | | | |
|---|---|---|---|
| 3,427,605 | 2/1969 | Gabor | 340/174.1 A |
| 3,202,975 | 8/1965 | Magotteaux | 340/174.1 A |
| 3,230,514 | 1/1966 | Kliman | 235/92 SH |
| 3,626,395 | 12/1971 | Quiogue | 340/174.1 G |
| 3,631,429 | 12/1971 | King | 340/174.1 G |

*Primary Examiner*—Maynard R. Wilbur
*Assistant Examiner*—Robert F. Gnuse
*Attorney*—Norman J. O'Malley, John F. Lawler and Theodore C. Jay, Jr.

[57] ABSTRACT

A digital data recording system for recording digital information on a recording medium with each record separated by an inter-record gap and the characters within each record separated by an inter-character gap and a reproducing system for reproducing the data which includes an inter-character detector which detects the inter-character gap and destroys the recovered character if at the time of occurrence of such gap the complete character has not been reproduced and the inter-record gap detector which stops reproduction at the completion of each record.

7 Claims, 5 Drawing Figures

WILLIAM C. BENNETT
DAVID C. CONDON
RODNEY O. BRINK
INVENTOR

BY Flehr, Hohbach, Test, Albritton and Herbert
ATTORNEYS

INVENTORS
WILLIAM C. BENNETT, DAVID C. CONDON
RODNEY O. BRINK
BY
Flehr, Hohbach, Test, Albritton and Herbert
ATTORNEYS INVENTORS
WILLIAM C. BENNETT, DAVID C. CONDON,
RODNEY O. BRINK
BY
Flehr, Hohbach, Test,
Albritton and Herbert
ATTORNEYS

DIGITAL DATA RECORDING AND REPRODUCING SYSTEM

BACKGROUND OF THE INVENTION

This invention relates generally to digital data systems and more particularly to a digital data recording and reproducing system.

In operation of computer peripheral equipment, it is often necessary or desirable to store digital data on a recording medium such as magnetic tape. The data may be recorded onto the medium at a slow rate as, for example, from a typewriter or teletype after suitable processing. Provision can also be made for correction during entry. Thereafter, the information can be reproduced, processed and transferred at a fast synchronous rate to an associated computer or other equipment. The receipt of data from remote terminals such as computers and other associated equipment can also be enhanced by the use of a recording and reproducing system wherein the data is recorded as it is received and thereafter reproduced and used as needed.

OBJECTS AND SUMMARY of THE INVENTION

It is a general object of the present invention to provide an improved digital data recording and reproducing system.

It is another object of the present invention to provide a digital recording and reproducing system in which during reproduction the system is re-synchronized on each character within a record and if any bits (portion) of a character are lost, the character is rejected and the system re-synchronizes at the next character thereby losing only one character.

It is another object of the present invention to provide a system in which the data is recorded in the form of characters separated by inter-character gaps and records separated by longer inter-record gaps.

It is another object of the present invention to provide a digital data recording and reproducing system which employs a single transducer for recording and reproduction.

The foregoing and other objects of the invention are achieved by a digital data recording system in which digital data from associated equipment is received and temporarily stored and transferred to an input register where a clocking signal of predetermined reference frequency is employed to transfer the data bit by bit to an associated recording means whereby it is recorded onto the recording medium. The recording means includes means providing inter-character gaps and inter-record gaps. The system reproduces and processes the recorded information to reconstruct the characters. Means responsive to inter-character gaps reject incomplete characters and means stop the reproduce operation in response to an inter-record gap.

DESCRIPTION OF THE PREFERRED EMBODIMENT

Figure 1:
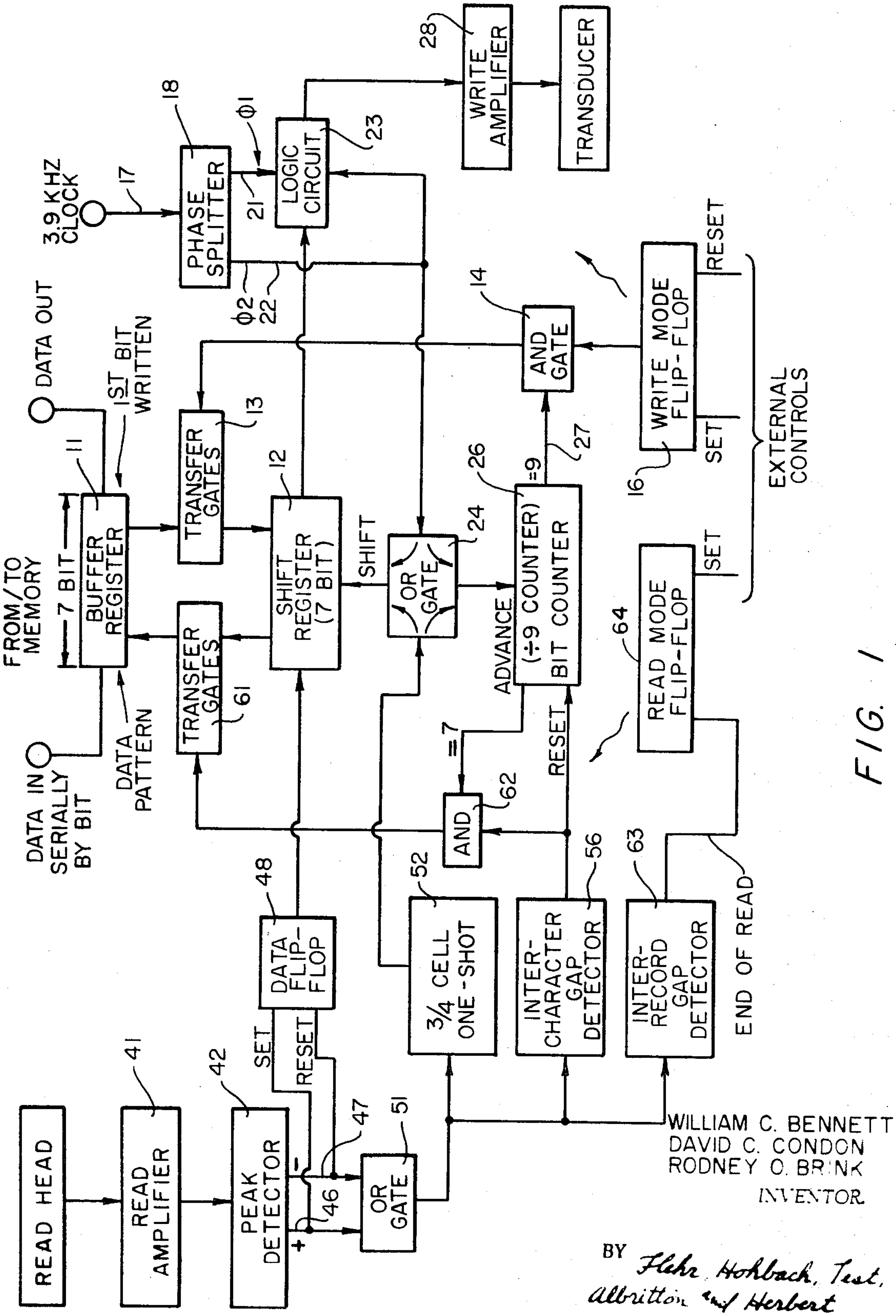
FIG. 1 is a block diagram of a digital data recording and reproducing system in accordance with the present invention.

Referring to FIG. 1, the data from associated apparatus, for example, a computer memory, is serially transferred into a buffer register 11. The data is transferred under control of the associated apparatus. In the example which follows it is assumed that each character of information contains seven bits. Each character is transferred into the buffer register 11 and held. The character is then transferred into shift register 12 for application to the record circuits for application to the associated transducer for recording on an associated recording medium. The recording medium may, for example, be a magnetic tape contained in a tape cartridge of the type described in copending application entitled "Coaxial Tape Cartridge", Ser. No. 886 which may be operated upon by apparatus of the type shown in copending application entitled "Apparatus for Operating on Tape in Tape Cartridges" Ser. No. 22,619. The information is transferred from the buffer register 11 by transfer gate 13. The transfer gate is controlled by AND gate 14 which receives control signals from a write mode flip-flop 16 controlled by the associated apparatus and from a bit counter 26 to be presently described.

The transfer of data from the shift register 12 is controlled by a clock input which determines the bit length. The clock input may, for example, be applied along line 17 to a phase splitter 18 which provides output signals on the lines 21 and 22 having one-half the frequency of the input signal on the line 17 180° out of phase with one another. Referring particularly to FIG. 4A, the timing pulses are illustrated while in FIGS. 4B and 4C, the pulses appearing on the lines 21 and 22 are shown.

The pulses on line 21 having the first phase are applied to write logic circuit 23 and the pulses having the opposite phase are applied on line 22 to an OR gate 24. Output pulses from gate 24 are applied both to shift register 12 for shifting the information bit by bit from the register and to the bit counter 26 which serves to count the clock pulses. The counter 26 is a divide-by-nine counter whereby after nine pulses are applied, an output pulse appears on the line 27 and is applied to the AND gate 14. When a pulse appears on the line 27 and the flip-flop 16 is in the write mode, the AND gate 14 passes a control signal to the transfer gate 13. The transfer gate 13 and the character stored in the buffer register 11 are transferred into the shift register 12. It is to be noted, however, that the transfer takes place only at nine bit intervals, while the data characters have seven bits whereby after the seven bits of data are transferred from the shift register, two zeroes are transferred to the write logic 23.

Figure 4:
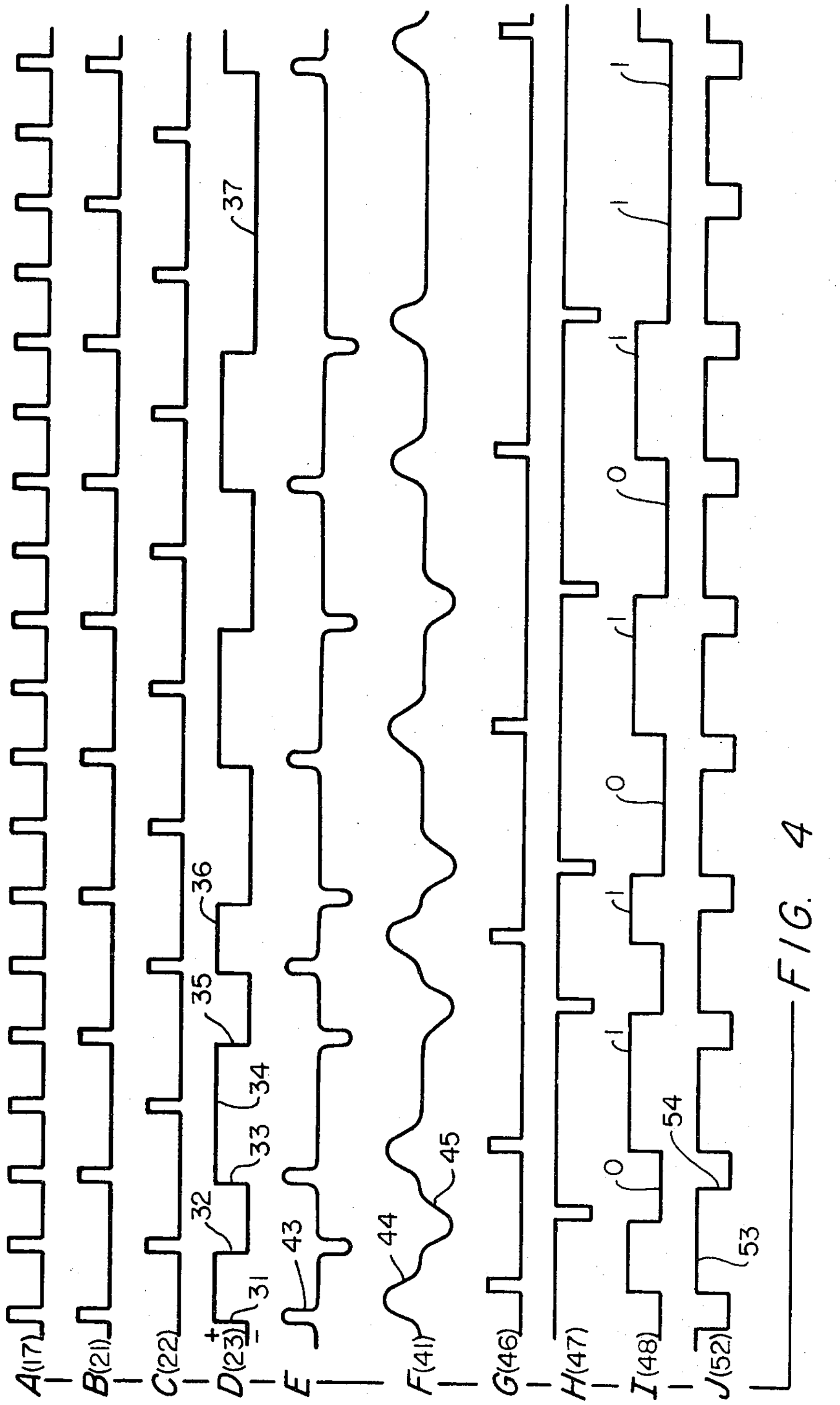
FIG. 4 is a chart showing the signals appearing at various portions of the system during record and reproduce, and their timing.

The write logic circuit 23, FIGS. 1 and 4, controls the current to the write amplifier 28 in accordance with the following rule: At the beginning of each bit time, there is a transition of current from one direction to the other direction. Data is contained only in the last half of each bit and is represented by the direction of current through the head at that time. Bits 8 and 9 are always in the direction of zero with no transitions at the beginning of each bit.

Taking for example, the digital character 0110101 and operating in accordance with the rule just stated, the current levels will be as shown in FIG. 4D. In accordance with the above rule, there is a + change in current direction at the beginning of the first bit time 31. At the middle of the bit time, as identified by the clock in the second phase, the write logic circuit 23 determines that the data is zero and changes the direction to the direction 32. At the beginning of the next bit time, there is a + transition 33. At the middle of the bit time the data being one, the direction remains in the positive direction as shown at 34. At the beginning of the next bit time, there is a transition to the other direction 35. At the middle of the third bit time, the data is one and the direction is changed to the one direction 36. The operation of the system to record the remainder of the character is apparent. Referring again to FIG. 4D, the last two bit times 8 and 9 are "zero" as shown at 37.

Figure 2:
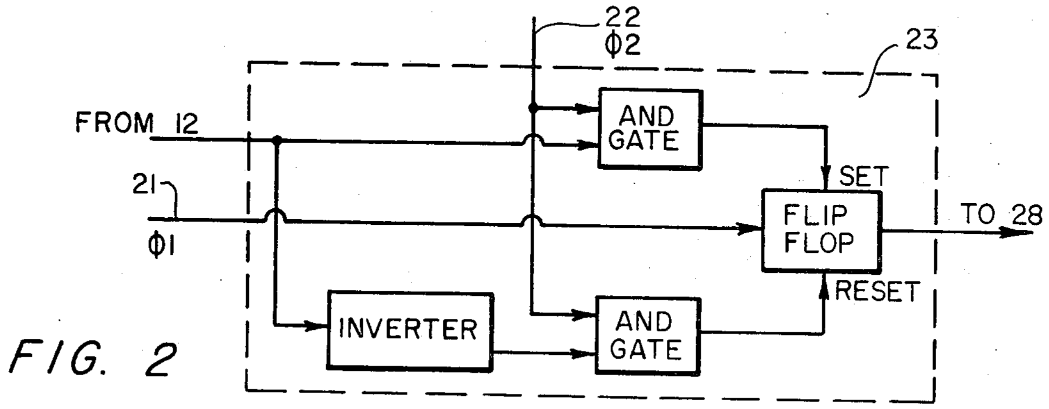
FIG. 2 is a more detailed block diagram of the logic circuit shown in FIG. 1.

The logic circuit 23 is shown in more detail in FIG. 2. The data from shift register 12 is applied directly to one AND gate and is also directly inverted and applied to a second AND gate. Timing pulses of $0_1$(line 21) are also applied to the AND gates. The outputs of the AND gates are applied to a flip-flop to set and reset the flip-flop which is initially caused to switch state in response to the input timing pulse of $0_1$ (line 21). The output from the flip-flop obeys the above rule.

Figure 3:
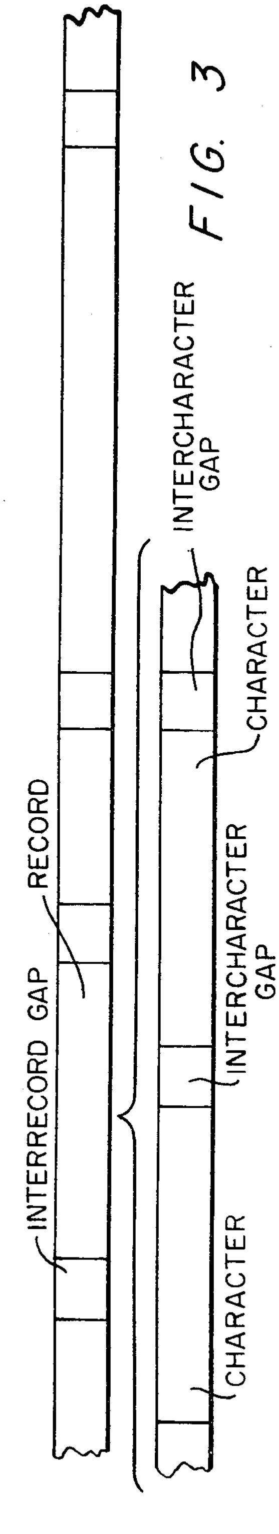
FIG. 3 is a schematic representation of a portion of a record in accordance with the present invention.

Thereafter, there is a transition and the next character is read and applied to the transducer. When the write flip-flop 16 is reset, meaning that there is no further data to be transferred into the system, the associated magnetic tape recording apparatus is turned off. In the write mode, the write amplifier is designed to drive the single record-reproduce head with current of one polarity for 1 and a reverse polarity for 0. The write command is also applied to start the magnetic tape drive to drive the tape in a forward direction. A delay (not shown) is introduced allowing the tape to come up to speed before writing can begin. Thereafter, a command is applied to the write mode flip-flop 16 which serves to command the transfer of data from the buffer register 11 into the shift register 12. The data is then shifted out to the write amplifier one bit at a time and written on the tape. After the nine bit time has elapsed, the data waiting in the input buffer register 11 is transferred to the shift register 12 and more data is requested from the memory. After the second character is recorded, data received is examined to see if another character has been received. If the character is received, it is again transferred to the register 12 and written on the tape. The foregoing steps are repeated until there is no more data to be recorded, at which time the write mode flip-flop is switched and the tape apparatus turned off. The recorded data is illustrated in FIG. 3 which shows the records with inter-record gaps and a portion of a record expanded to show the characters with inter-character gaps.

For reproduction the tape is rewound or the transducer is otherwise associated with the beginning of the record. Upon receipt of a read command, the forward clutch of the magnetic tape apparatus is engaged to drive the tape past the transducer or the recording medium is otherwise moved with respect to the transducer for playback. The following description is directed to a magnetic tape recording. The flux transitions on the magnetic tape read by the transducer are amplified by amplifier 41 and thence applied to a peak detector 42. Referring more particularly to FIG. 4E, the reproduce voltages are illustrated. It is to be noted that a voltage or current is induced in the reproduce transducer only when there is a flux change. Thus, the current or voltage pulses occur only at the transitions and are represented by the pulses 43. In FIG. 4E, the ideal reproduced pulses are shown, whereas in actual practice, the pulses are not sharp and are generally as shown in FIG. 4F at 44 and 45 for positive and negative pulses respectively.

In accordance with the preferred embodiment of the present invention, the transducer for recording and reproducing is the same transducer employing a push-pull type of record-reproduce amplifier. Thus, the winding is used for both the read and write and does not require switching circuits when going from the record to the read mode. The impedances are selected such that one amplifier does not load or otherwise influence the operation of the other and the playback circuits are protected against heavy overloading during the recording operation.

Figure 5:
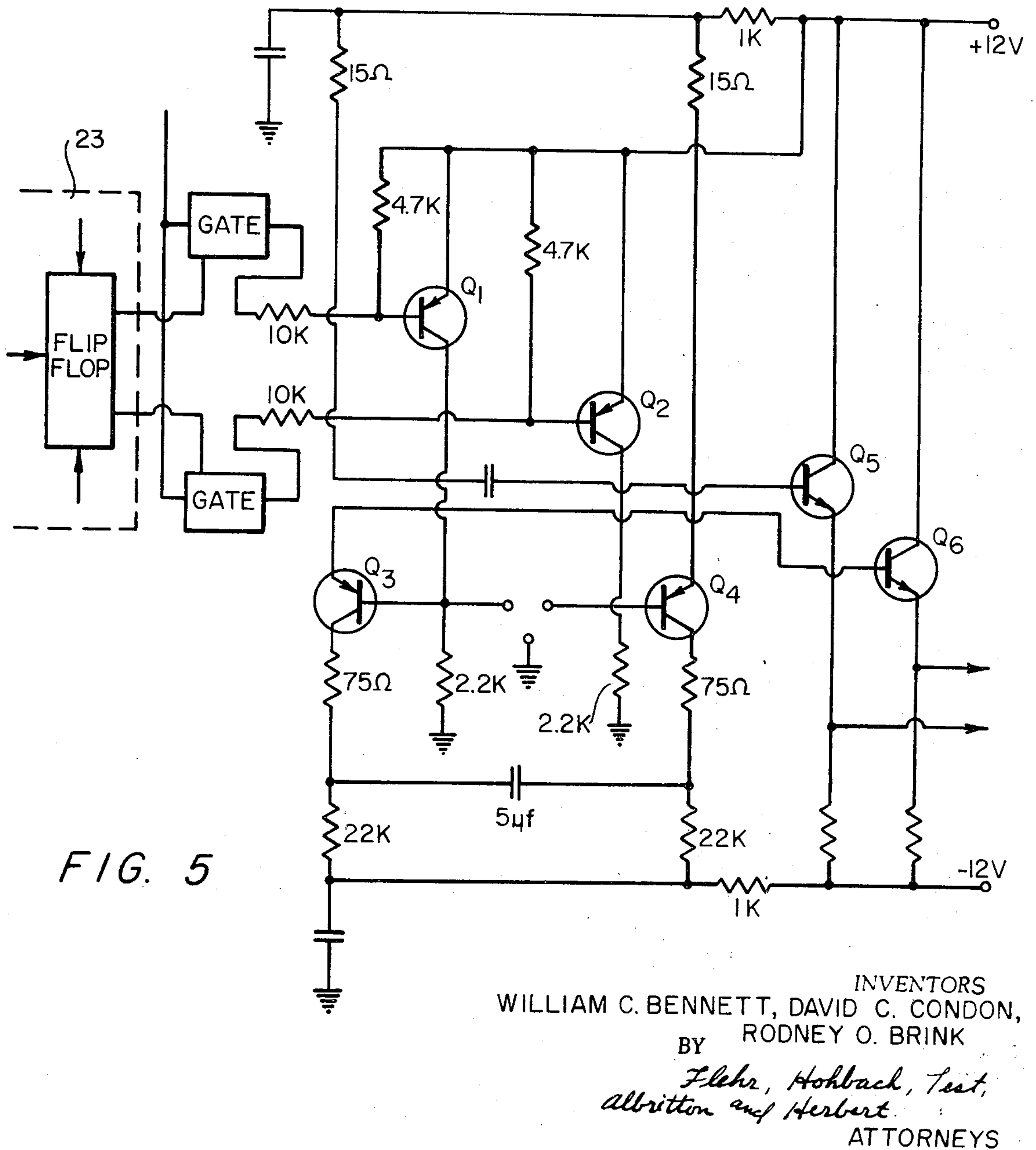
FIG. 5 is a diagram of the read and write circuits associated with the single transducer.

A circuit diagram of the read and write amplifiers is shown in FIG. 5. The transistors $Q_1$ and $Q_2$ together with associated circuitry form the write amplifier. The transistors $Q_3$, $Q_4$ and emitter followers $Q_5$ and $Q_6$ together with associated circuitry form the read amplifier. A pair of gates control the application of signal to the transistors $Q_1$ and $Q_2$.

To recover the data, the present invention makes use of a peak detector 42 which provides an output signal on the lines 46 and 47 when positive or negative pulses 44 or 45 are sensed. These pulses are illustrated in FIGS. 4G and 4H respectively. The pulses are applied to a data flip-flop 48 which is triggered to set and reset with the positive and negative going pulses respectively to form an output pulse waveform of the type shown at FIG. 4I. It will be observed that this waveform is identical to that shown at FIG. 4D with the exception that it has a slight delay. Thus, the originally recorded character is faithfully reproduced. It is to be remembered that the data is contained only in the last half of each bit time. This is the data which must be clocked into the shift register 12.

The outputs on the lines 46 and 47 are applied to an OR gate 51 which supplies its output to retriggerable one-shot 52 which has a period of three quarters of a bit time. Thus, once it is triggered, the one-shot remains in one state for three quarters of a bit time and thereafter transfers to its other state ready to be re-triggered. The one-shot output is shown at FIG. 4J with three quarter periods shown at 53. The transition 54 controls the shift register 12 through OR gate 24 and data is entered at this time. It is seen that the level from the flip-flop 48 at this time is the digital data. Referring to FIG. 4I, the data is 0 at the first transition; 1 at the second transition; 1 at the third transition; 0 at the fourth transition; 1 at the fifth transition; 0 at the sixth and 1 at the seventh (0110101), with zeroes at the eighth and ninth bit providing the original data to the shift register 12.

When the inter-character gap 00 is present, the data is transferred from the shift register 12 to the buffer 11 for transfer to associated apparatus. This is achieved by the inter-character gap detector 56 which is a retriggerable one-shot bistable circuit with a one and one-half bit period. Thus, at the beginning of a character, the one-shot is triggered and retriggered at the start of each bit time and during the eighth or ninth bit time it will change levels (recover) applying its signal to the transfer gate 61 to transfer information from the shift register 12 to the buffer register 11.

The data from the three quarters bit one-shot 52 is also applied to the counter 26 which provides an output when the count is seven. Thus, if seven bits of data do not appear when the inter-character gap one-shot switches, no signal can be transferred through the AND gate 62 to the transfer gate 61. The transfer of erroneous or incomplete data is inhibited.

An inter-record gap detector 63 applies a signal to the read mode flip-flop 64 which serves to turn off the reproducer and allow the apparatus to stand quiescent when an inter-record gap is detected.

We claim:

1. A digital data system including a transducer adapted to receive digital data and apply it to a recording medium to record the digital data on the recording medium comprising means for generating clocking signals at a reference frequency, means for receiving said signals and providing first and second signals each having half the reference frequency and being out of phase, a logic means for receiving said two signals and controlling application of signal to said transducer, said logic means providing a transition at the beginning of each bit time of a data character occuring at said first interval and providing a signal representative of the data only during the second half of each bit time, a shift register for storing digital information, and means for applying said second signal to said shift register whereby the data is transferred bit by bit to said logic means which processes the information and applies the signal to said transducer.

2. A system as in claim 1 wherein said logic means provides a signal representative of a zero during at least two bit times following each data character.

3. A digital data system including a transducer adapted to receive digital data and apply it to a recording medium to record the digital data on the recording medium comprising means for generating clocking signals at a reference frequency, means for receiving said signals and providing first and second signals each having half the reference frequency and being out of phase, a logic means for receiving said two signals and controlling application of signal to said transducer, a shift register for storing digital information, means for applying said second signal to said shift register whereby the data transferred bit by bit to said logic means which processes the information and applies the signal to said transducer, a storage means for receiving data serially from associated apparatus and temporarily storing same, and means for transferring the data to said shift register when a character has been transferred to said logic means, said transfer means being operated in response to a predetermined count.

4. A system for reproducing digital data of the type which includes multi-bit characters separated by inter-character gaps of a predetermined length from a recording medium, said recorded data including a transition at the beginning of each bit and the data in the second half only of each bit including a transducer cooperating with said medium and providing an output pulse when the recorded data has a transition, a peak detector for detecting peaks in said pulse, a flip-flop for providing output signals whose level changes each time a negative or positive peak is sensed, a shift register for receiving said output signal and means for shifting said register during the last half of each bit time in timed relationship with said output pulses to transfer the reproduced data into said shift register.

5. A system as in claim 4 in which said means for shifting said register comprises means forming a signal at each three quarter bit time.

6. A system as in claim 4 including an output buffer register and means for transferring the data in said shift register during an inter-character gap.

7. A system as in claim 6 including means for inhibiting the transfer of data if a complete character has not been reproduced.

* * * * *